(12) United States Patent
Fukuhara

(10) Patent No.: US 10,124,282 B2
(45) Date of Patent: Nov. 13, 2018

(54) FILTER DEVICE

(71) Applicant: EAGLE INDUSTRY CO., LTD., Tokyo (JP)

(72) Inventor: Takuto Fukuhara, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 227 days.

(21) Appl. No.: 14/916,443

(22) PCT Filed: Nov. 5, 2014

(86) PCT No.: PCT/JP2014/079354
§ 371 (c)(1),
(2) Date: Mar. 3, 2016

(87) PCT Pub. No.: WO2015/068733
PCT Pub. Date: May 14, 2015

(65) Prior Publication Data
US 2016/0214047 A1 Jul. 28, 2016

(30) Foreign Application Priority Data
Nov. 5, 2013 (JP) .................. 2013-229709

(51) Int. Cl.
*B01D 46/00* (2006.01)
*B01D 46/24* (2006.01)
(Continued)

(52) U.S. Cl.
CPC ......... *B01D 46/0005* (2013.01); *B01D 46/24* (2013.01); *B03C 1/0332* (2013.01);
(Continued)

(58) Field of Classification Search
None
See application file for complete search history.

(56) References Cited

U.S. PATENT DOCUMENTS 4,304,411 A * 12/1981 Wilcock ............... F16J 15/008
277/410
4,846,592 A 7/1989 Tsumori et al.
(Continued)

FOREIGN PATENT DOCUMENTS

| JP | S61-201964 A | 9/1986 |
|----|----|----|
| JP | H01-140072 U | 9/1989 |

(Continued)

OTHER PUBLICATIONS

Extended European Search Report dated May 22, 2017.

*Primary Examiner* — Amber R Orlando
*Assistant Examiner* — Brit E. Anbacht
(74) *Attorney, Agent, or Firm* — Harness, Dickey & Pierce, P.L.C.

(57) ABSTRACT

A filter device (100) includes an annular filter (110) provided on a shaft (10) and a rotary seal (120) for sealing an annular gap between the filter (110) and a housing (20). The rotary seal (120) includes an annular magnet (140) provided on the filter (110) and a flexible annular sealing member (130) provided on the housing (20). The sealing member (130) is provided on an upstream side of the magnet (140) and includes an annular opposing portion (132) that opposes the magnet (140) in an axial direction, and a magnetic fluid (150) soaked into the opposing portion (132). The opposing portion (132) makes contact with the magnet (140).

6 Claims, 10 Drawing Sheets

(51) Int. Cl.
    *B03C 1/033*     (2006.01)
    *B03C 1/28*     (2006.01)
    *F16J 15/00*     (2006.01)
    *F16J 15/32*     (2016.01)
    *F16J 15/34*     (2006.01)
    *F16J 15/43*     (2006.01)

(52) U.S. Cl.
    CPC ............ *B03C 1/286* (2013.01); *F16J 15/002* (2013.01); *F16J 15/32* (2013.01); *F16J 15/3444* (2013.01); *F16J 15/43* (2013.01); *B01D 46/0056* (2013.01); *B01D 2271/02* (2013.01)

(56) References Cited

U.S. PATENT DOCUMENTS

| | | | |
|---|---|---|---|
| 4,874,407 A * | 10/1989 | Lefkowitz | ............ B01D 46/12 55/282.3 |
| 5,325,004 A | 6/1994 | Mori et al. | |
| 2013/0161910 A1 | 6/2013 | Fukuhara | |

FOREIGN PATENT DOCUMENTS

| | | |
|---|---|---|
| JP | H0564387 A | 3/1993 |
| WO | 2012/105301 A1 | 8/2012 |

\* cited by examiner

FILTER DEVICE

CROSS-REFERENCE TO RELATED APPLICATIONS

This application is a National Stage of International Application No. PCT/JP2014/079354, filed Nov. 5, 2014 (now WO 2015/068733A1), which claims priority to Japanese Application No. 2013-229709, filed Nov. 5, 2013. The entire disclosures of each of the above applications are incorporated herein by reference.

FIELD

The present disclosure relates to a filter device for removing foreign matters that are contained in a fluid flowing through an annular gap between a shaft and a housing that rotate relative to each other.

BACKGROUND

Conventionally, there has been known a configuration in which a magnetic fluid seal is provided in an annular gap between a shaft and a housing that rotate relative to each other, and a filter is further provided in an air hole that communicates two regions separated by the magnetic fluid seal (see Patent Literatures 1 and 2, for example). This configuration enables the removal of the foreign matters contained in a gas in the annular gap, while keeping the friction torque low. One of the problems with this configuration, however, is that because the magnetic fluid seal and the filter are provided separately, a configuration for providing the magnetic fluid seal together with the filter becomes relatively large. Moreover, while the pressure difference between the two regions can be eliminated with the use of the air hole, the magnetic fluid is still likely to disperse when, for example, a relatively high pressure acts on the magnetic fluid seal.

In addition, the foregoing configuration employs a conventional magnetic fluid seal that retains the magnetic fluid in a small annular gap between the shaft and a pole piece provided in the housing. Therefore, in this configuration, when re-inserting the shaft, that has been removed from the housing, into the housing, the position of the shaft with respect to the housing (the position of the shaft in the axial direction and the radial direction) needs to be adjusted with high precision. Note that because the removed foreign matters accumulate in the filter, the filter needs to be replaced. Depending on where the filter is installed within the housing, the shaft may need to be removed from the housing for replacing the filter. Therefore, according to such a configuration in which the conventional magnetic fluid seal is employed, it is difficult to position the shaft in the axial direction and radial direction when inserting the shaft, and as a result, a work to replace the filter also becomes difficult.

Incidentally, a magnetic fluid seal that stably retains a magnetic fluid even during an occurrence of an eccentric motion of the shaft is proposed (see Patent Literature 3, for example). In this magnetic fluid seal, however, an impact of the fluid pressure in the annular gap on the magnetic fluid is not taken into consideration; hence, there is a possibility of the magnetic fluid being dispersed when a relatively high fluid pressure is applied.

CITATION LIST

Patent Literature

Patent Literature 1: Japanese Patent Application Laid-open No. H5-64387
Patent Literature 2: Japanese Utility Model Application Publication No. H1-140072
Patent Literature 3: WO 2012/105301

SUMMARY

Technical Problem

The present disclosure was contrived in view of these circumstances, and an object thereof is to provide a filter device having a filter and a rotary seal to remove foreign matters contained in a fluid flowing through an annular gap between a shaft and a housing that rotate relative to each other, that achieves a size reduction of the device and satisfaction of both a low-friction torque and pressure tightness, while also enables an easy replacement of the filter.

Solution to Problem

The present disclosure employs the following means to solve the foregoing problem. Specifically, a filter device according to the present disclosure is a filter device for removing foreign matters that are contained in a fluid flowing through an annular gap between a shaft and a housing that rotate relative to each other, the filter device including: an annular filter provided on one of the shaft and the housing; and a rotary seal for sealing an annular gap between the filter and another of the shaft and the housing that is not provided with the filter, wherein the rotary seal includes: an annular sealing member having flexibility; and an annular magnetic field forming member for forming a magnetic field, wherein one of the sealing member and the magnetic field forming member is provided on the filter, and another of the sealing member and the magnetic field forming member is provided on the other of the shaft and the housing that is not provided with the filter, the sealing member is provided on an upstream side of the magnetic field forming member and includes an annular opposing portion that opposes the magnetic field forming member in an axial direction, and a magnetic fluid soaked into the opposing portion, wherein the opposing portion is adapted to make contact with the magnetic field forming member when it is attracted toward the magnetic field forming member due to a magnetic force acting on the magnetic fluid.

The magnetic force of the magnetic field formed by the magnetic field forming member acts on the magnetic fluid soaked into the opposing portion of the sealing member. Note that this opposing portion is located on a free-end side of the sealing member and is therefore attracted toward the magnetic field forming member by this magnetic force, together with the soaked magnetic fluid. As a result, the sealing member having flexibility deforms so as to sway, bringing the opposing portion into contact with the magnetic field forming member. Because the opposing portion that is in contact with the magnetic field forming member is constantly pressed against the magnetic field forming member by the magnetic force, an annular sealing surface is stably formed between the sealing member and the magnetic field forming member. In addition, some of the soaked magnetic fluid is further attracted toward the magnetic field forming member by the magnetic force and exudes from the opposing portion. Consequently, the surfaces of the opposing portion and the magnetic field forming member that oppose each other are lubricated by the magnetic fluid intervening therebetween. According to this configuration, the annular gap between the filter and the one of the shaft and the housing that is not provided with the filter can stably be sealed with a low-friction torque, even during the relative rotation between the shaft and the housing.

Note that one of the sealing member and the magnetic field forming member is provided on the filter, and the other is provided on one of the shaft or the housing that is not provided with the filter. Accordingly, the filter and the rotary seal can be integrally provided in the annular gap between the shaft and the housing. Therefore, the device can be made smaller than a filter device in which a filter and a rotary seal are configured from separate components.

Furthermore, because the sealing member is provided on the upstream side of the magnetic field forming member, the pressure of the fluid flowing through the annular gap acts on the sealing member in a direction toward the magnetic field forming member. The opposing portion of the sealing member is further pressed against the magnetic field forming member by this fluid pressure, thereby enhancing the sealing performance of the sealing surface between the sealing member and the magnetic field forming member. In other words, the pressure of the fluid contributes to the improvement of the sealing performance. In addition, the higher the fluid pressure, the stronger the opposing portion is pressed; hence, the sealing performance of the sealing surface is further enhanced. According to the filter device of the present disclosure, therefore, the sealing performance of the rotary seal can be favorably ensured, even in a case where a high fluid pressure acts. Specifically, high pressure tightness can be realized.

in addition, because the sealing member has flexibility, it can deform to a certain degree in the axial direction and the radial direction while having the opposing portion pressed against the magnetic field forming member. Therefore, even in a case where the axial or radial relative positions of the shaft and the housing rotating relative to each other change to a certain degree due to axial runout or the like, the sealing surface between the sealing member and the magnetic field forming member can favorably be maintained. Also, since the sealing member is attracted toward the magnetic field forming member, the position of the shaft within the housing can be set within a range in which the attracted sealing member can form a sealing surface between the magnetic field forming member and itself. Therefore, according to the rotary seal of the filter device of the present disclosure, positioning of the shaft upon insertion can be performed more easily when compared with the conventional magnetic fluid seal (the magnetic fluid seal in which the magnetic fluid is retained in the small annular gap between the shaft and the pole piece provided in the housing). Consequently, as for a work such as replacing of the filter, in which the shaft needs to be removed and then inserted again, it becomes easier to work on. Note that if such a configuration in which the filter is provided on the shaft is employed, the filter can easily be replaced by removing the shaft from the housing.

In the filter device according to the present disclosure, the magnetic field forming member may be configured to rotate faster than the sealing member.

According to this configuration, the sealing member rotates more slowly than the magnetic field forming member or remains still. For this reason, the centrifugal force acts less on the sealing member that is deformed to come into contact with the magnetic field forming member, as compared to a case where the sealing member rotates faster than the magnetic field forming member. Accordingly, a force in a centrifugal direction that inhibits the deformation of the sealing member acts less on the sealing member; thereby making the sealing surface between the sealing member and the magnetic field forming member more likely to be maintained favorably. In particular, in a case where the sealing member remains still and only the magnetic field forming member rotates, or in other words, in a case where one of the shaft and the housing remains still and the sealing member is provided on the one of the shaft and the housing that remains still, the sealing surface can favorably be maintained because no centrifugal force acts on the sealing member.

In the filter device according to the present disclosure, the filter may be made of a hard material. Examples of the hard material include metals and ceramics. According to this configuration, either the magnetic field forming member or the sealing member can be fixed directly to the filter, resulting in a further size reduction of the filter device.

In the filter device according to the present disclosure, the sealing member may be integrated with the filter by using the same material as that of the filter. Both the filter for removing foreign matters and the sealing member soaked with the magnetic fluid can be made of, for example, a porous material. Therefore, by using such a material in the filter and the sealing member to integrate the sealing member with the filter, the number of parts can be reduced, resulting in a further size reduction of the filter device.

In the filter device according to the present disclosure, the magnetic field forming member may be an electromagnet and the filter device may further include a controller for controlling the magnetic force of the magnetic field forming member. Accordingly, the magnetic force that acts on the magnetic fluid soaked into the opposing portion can be controlled, and consequently the sealing performance of the sealing surface between the sealing member and the magnetic field forming member can be adjusted. Moreover, the magnetic force of the magnetic field forming member can be eliminated when removing the shaft from the housing or inserting the shaft into the housing; thereby facilitating such works.

The filter device according to the present disclosure may further include a second magnetic field forming member that is an annular electromagnet provided on an upstream side of the sealing member on the one of the shaft and the housing that is provided with the magnetic field forming member, or on an upstream side of the sealing member provided on the one of the shaft and the housing that is provided with the filter provided with the magnetic field forming member, the second magnetic field forming member including a communicating hole that communicates a surface on an upstream side thereof and a surface on a downstream side thereof, wherein the controller further controls a magnetic force of the second magnetic field forming member, and the sealing member further includes an annular second opposing portion that opposes the second magnetic field forming member in the axial direction, and a magnetic fluid soaked into the second opposing portion, wherein the second opposing portion is adapted to make contact with the second magnetic field forming member when it is attracted toward the second magnetic field forming member due to a magnetic force acting on the magnetic fluid soaked into the second opposing portion.

According to this configuration, when the magnetic force is applied only to the magnetic field forming member by the controller, the opposing portion of the sealing member is attracted toward the magnetic field forming member; thereby forming a sealing surface between the magnetic field forming member and the sealing member. In this case, the fluid that flows through the annular gap between the shaft and the housing passes through the filter. On the other hand, when the magnetic force is applied only to the second magnetic field forming member, the magnetic force acts on the magnetic fluid soaked into the second opposing portion of the sealing member in the direction toward the second magnetic field forming member. As a result, the second opposing portion is attracted toward the second magnetic field forming member and comes into contact therewith, forming a sealing surface between the sealing member and the second magnetic field forming member. In this case, the fluid that flows through the annular gap between the shaft and the housing first passes through the communicating hole of the second magnetic field forming member. Note that when the second opposing portion is in contact with the second magnetic field forming member, the sealing member is drawn apart from the magnetic field forming member. Therefore, the fluid that has passed through the communicating hole passes through between the sealing member and magnetic field forming member as well as through the inside of the filter. In this case, therefore, more fluid can be flown through the annular gap between the shaft and the housing. In other words, when it is not necessary to remove the foreign matters from the fluid, the flow rate of the fluid flowing through the annular gap can be increased.

Advantageous Effects of the Disclosure

According to the filter device of the present disclosure that has a filter and a rotary seal to remove foreign matters contained in a fluid flowing through an annular gap between a shaft and a housing that rotate relative to each other, a size reduction of the device and satisfaction of both a low-friction torque and pressure tightness can be achieved. The present disclosure can also facilitate such works as removing or inserting the shaft; thereby providing a filter device that enables easy replacement of the filter.

DRAWINGS

Figure 4:
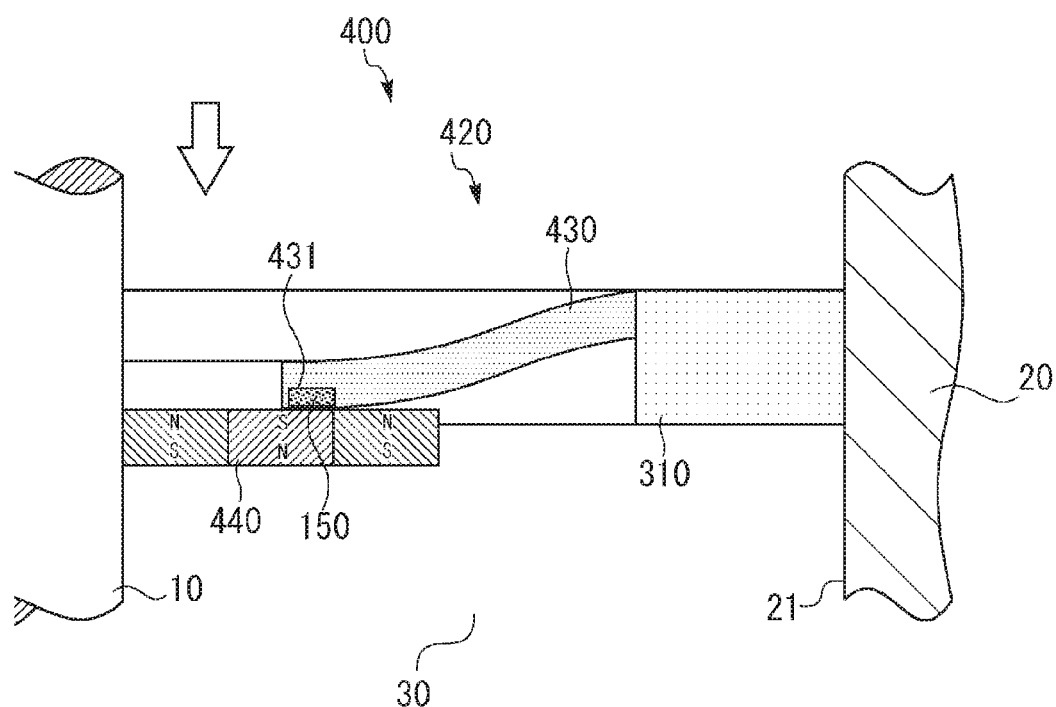
Figure 5:
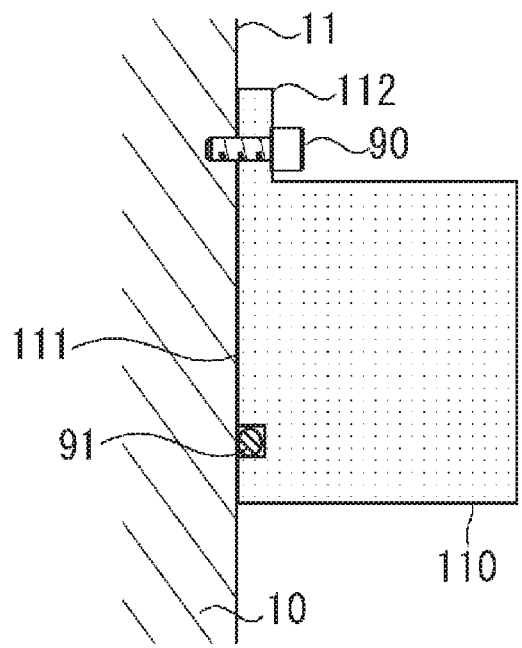
Figure 6:
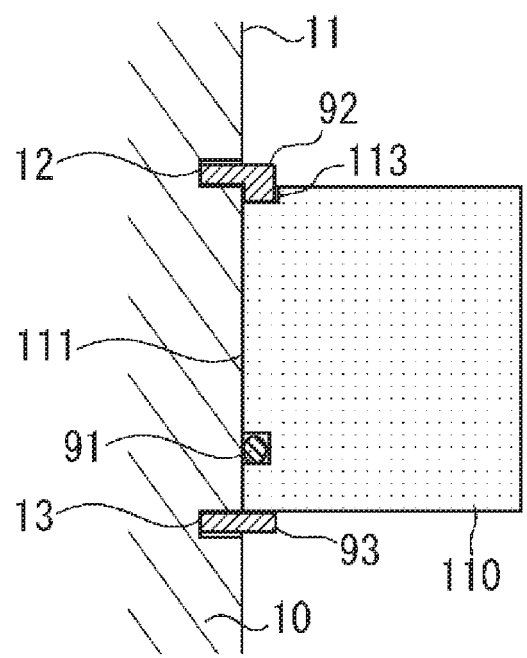
Figure 7:
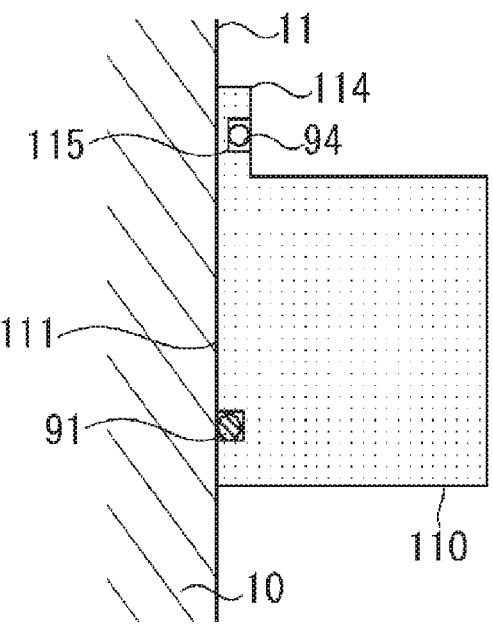
Figure 8:
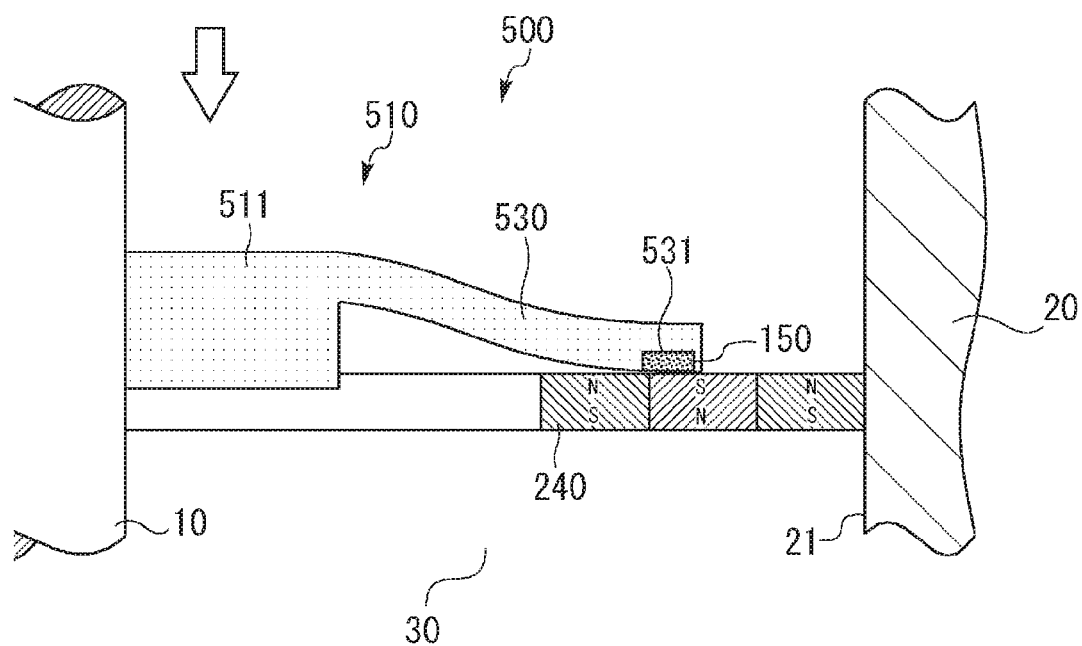
Figure 9:
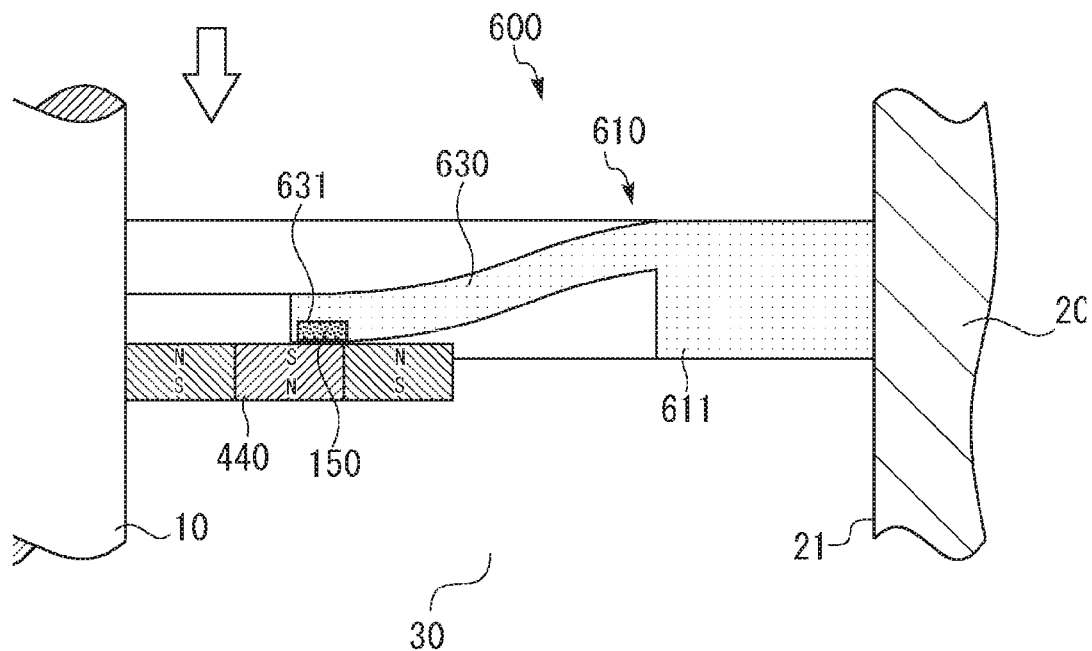
Figure 10:
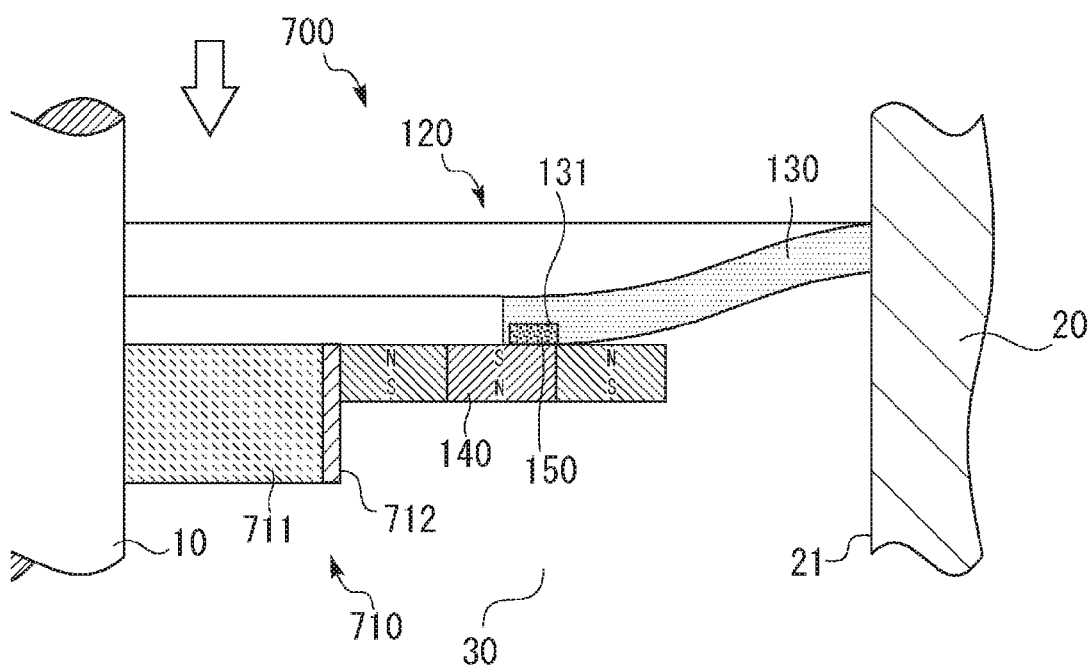
Figure 11:
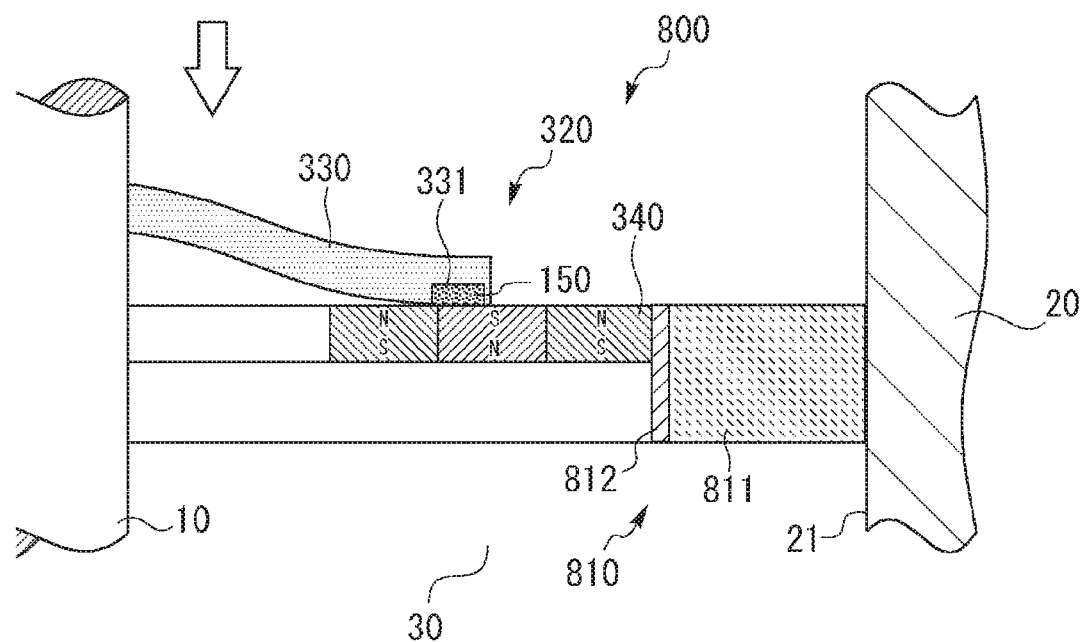
Figure 12:
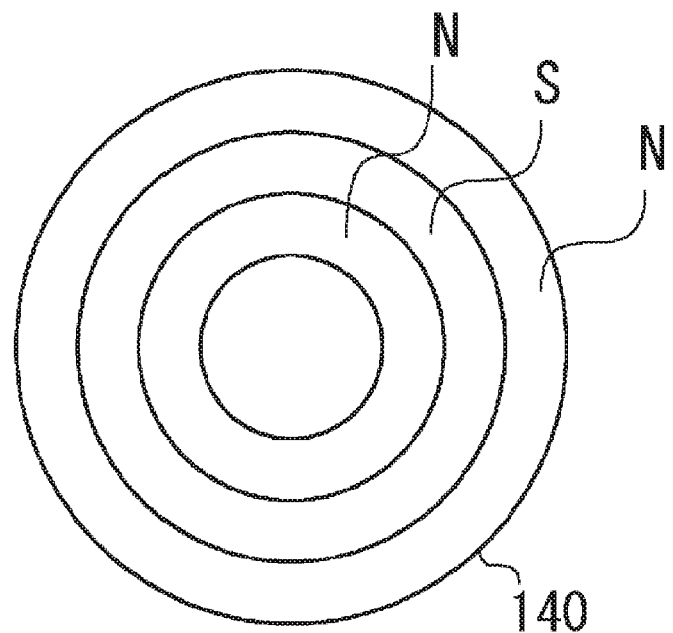
Figure 13:
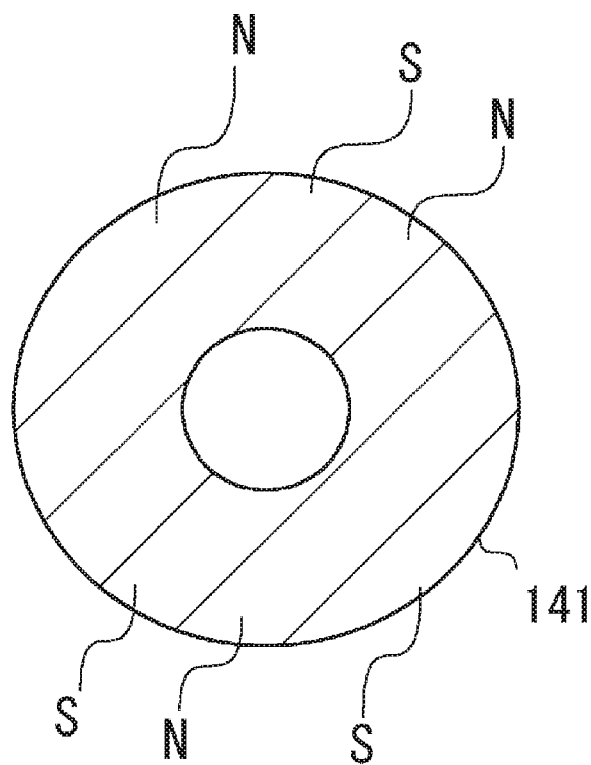
Figure 14:
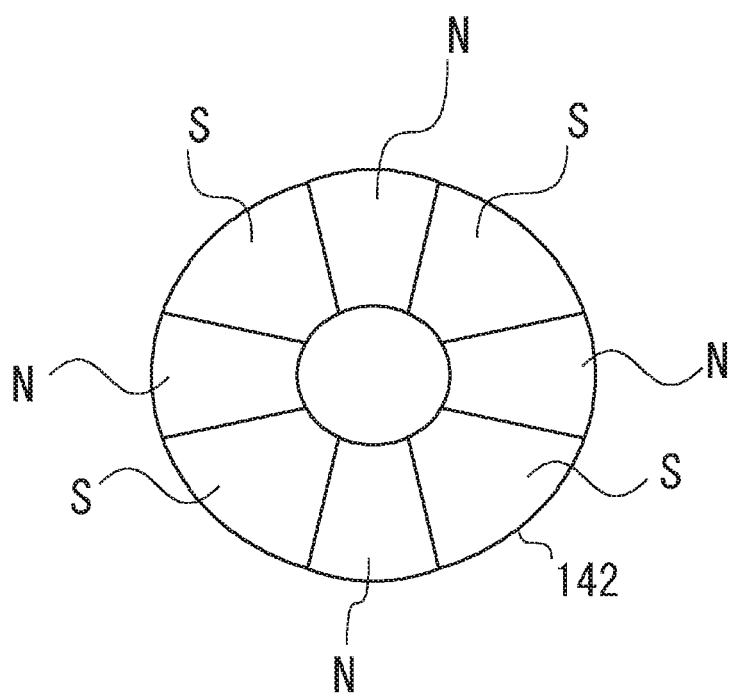
Figure 15:
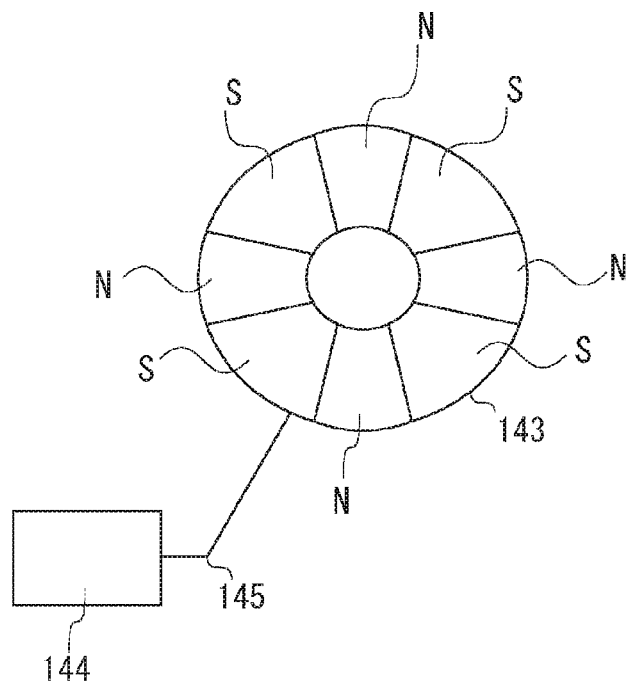
Figure 16:
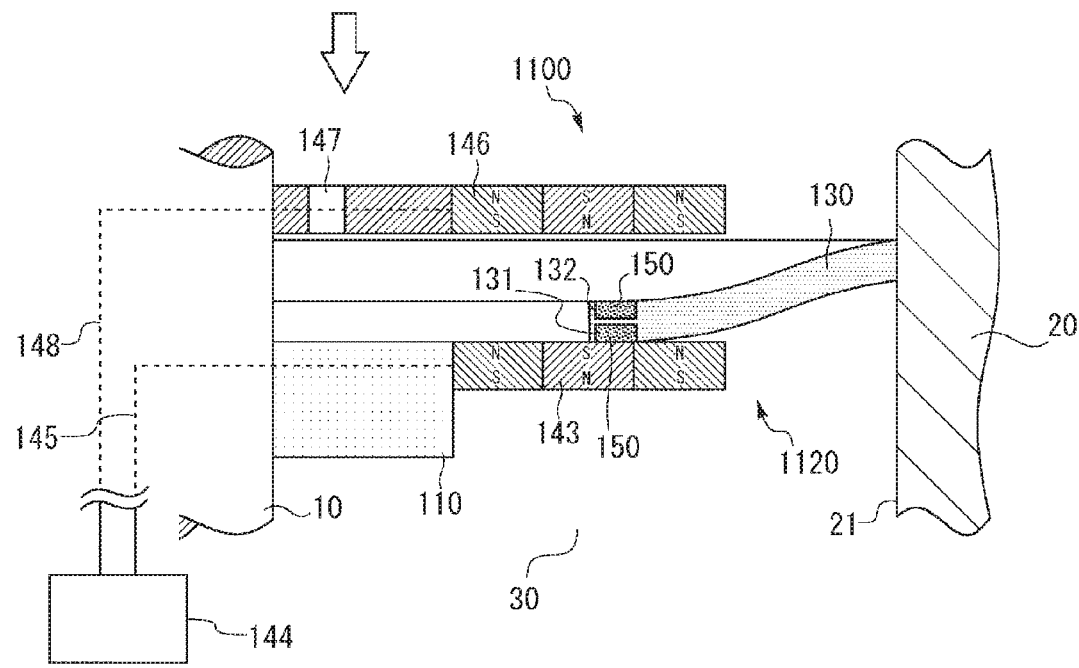
Figure 17:
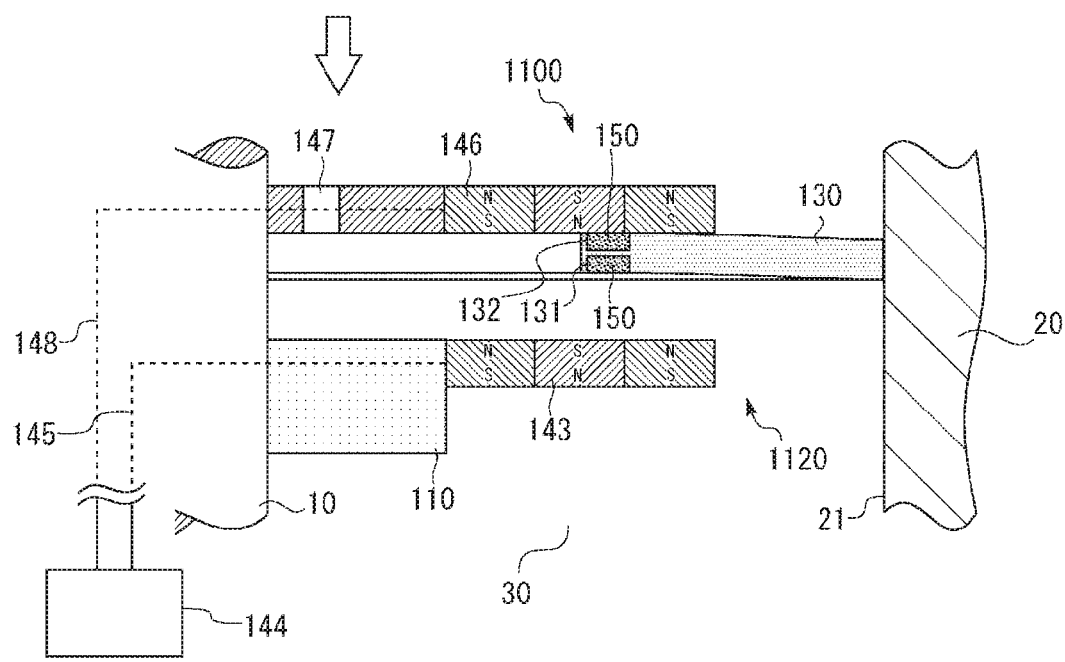
Figure 18:
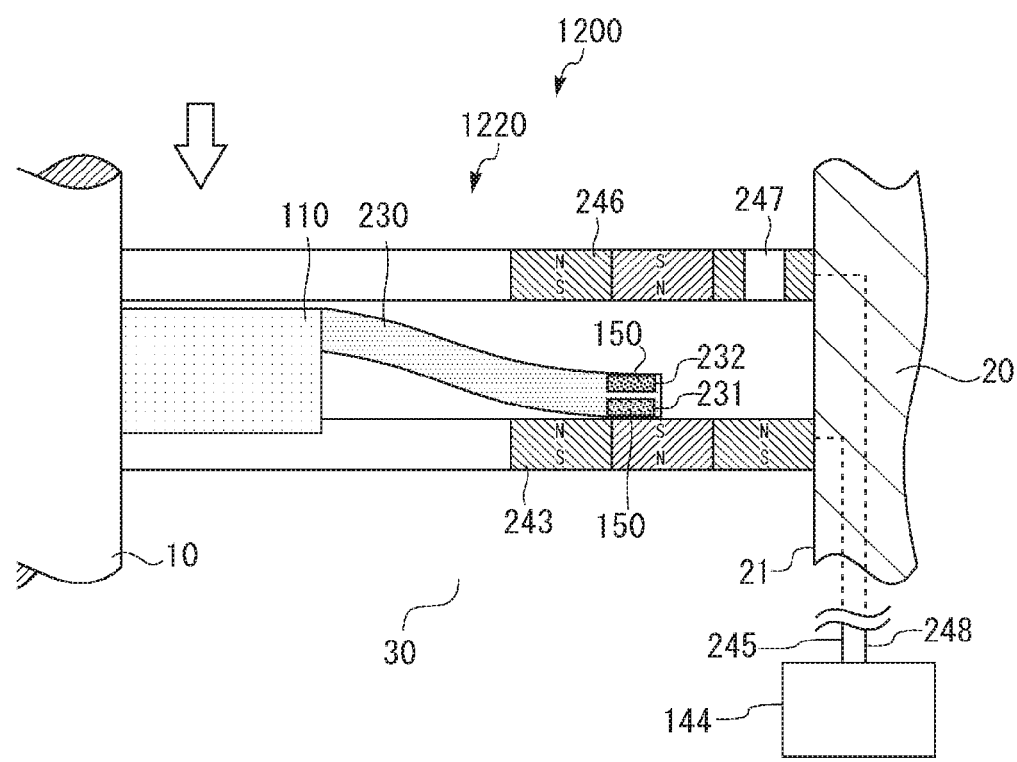
Figure 19:
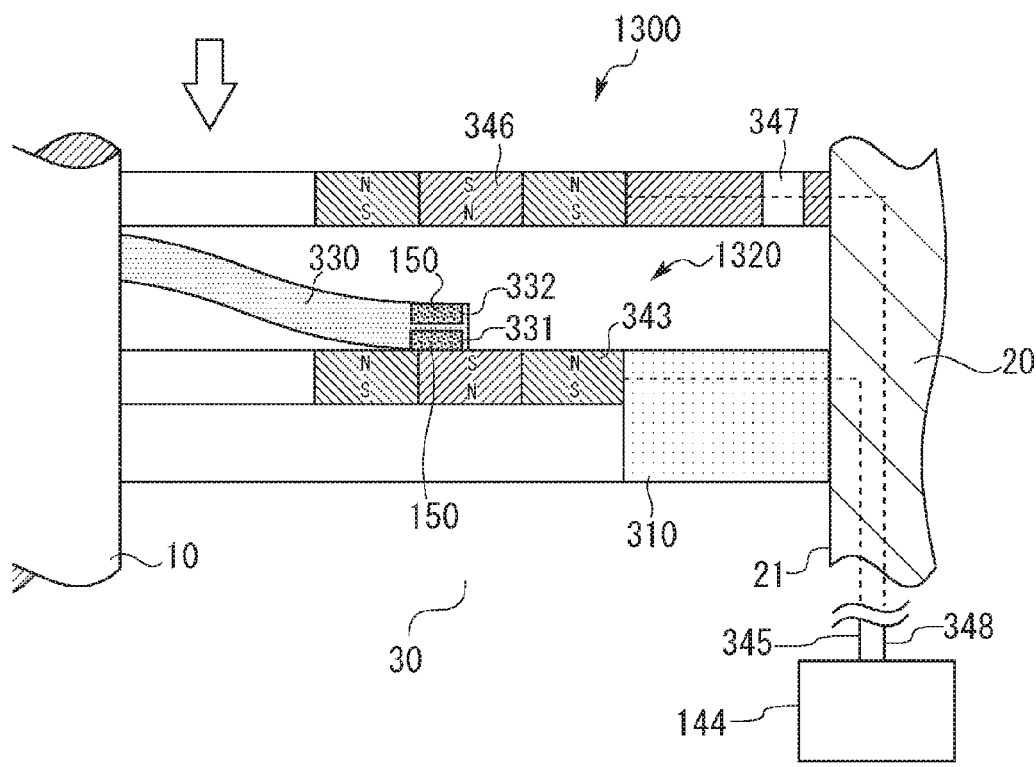
Figure 20:
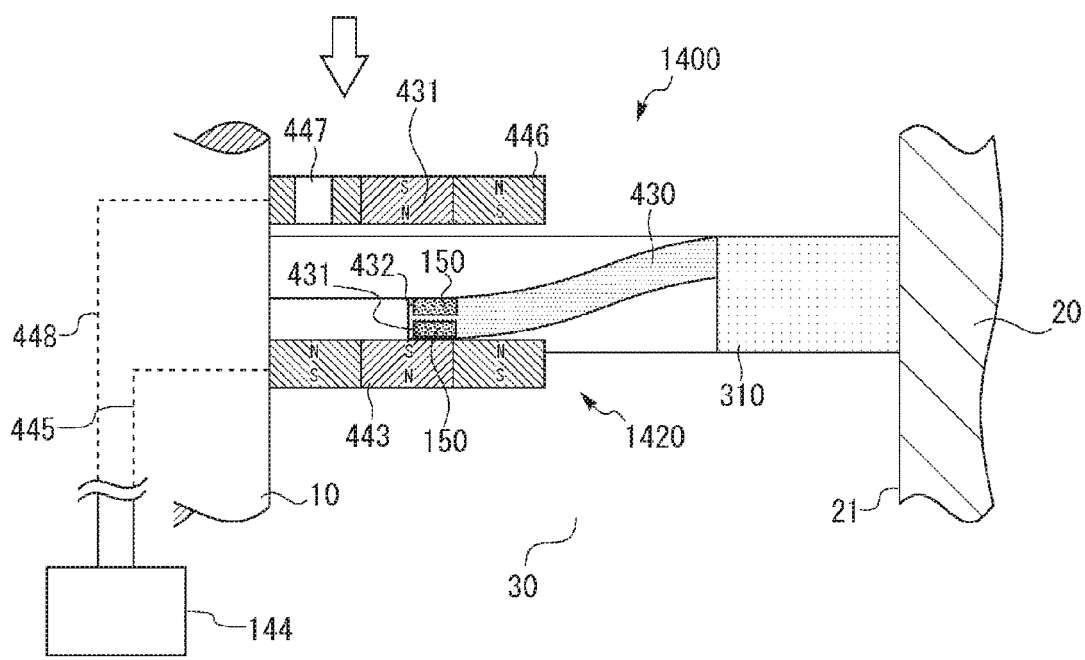

FIG. 4 a schematic cross-sectional diagram of a filter device according to Example 4 of the present disclosure;

FIG. 5 is a schematic cross-sectional diagram showing a filter fixation method according to the example;

FIG. 6 is a schematic cross-sectional diagram showing another filter fixation method according to the example;

FIG. 7 is a schematic cross-sectional diagram showing another filter fixation method according to the example;

FIG. 8 is a schematic cross-sectional diagram showing another configuration of the filter according to the example;

FIG. 9 is a schematic cross-sectional diagram showing another configuration of the filter according to the example;

FIG. 10 is a schematic cross-sectional diagram showing another configuration of the filter according to the example;

FIG. 11 is a schematic cross-sectional diagram showing another configuration of the filter according to the example;

FIG. 12 is a front view of a magnet according to the example;

FIG. 13 is a front view of another magnet according to the example;

FIG. 14 is a front view of another magnet according to the example;

FIG. 15 is a front view of another magnet according to the example;

FIG. 16 is a schematic cross-sectional diagram of a filter device according to an example that has a second magnetic field forming member showing a case where only a magnetic field forming member has a magnetic force;

FIG. 17 is a schematic cross-sectional diagram of the filter device according to the example that has the second magnetic field forming member showing a case where only a second magnetic field forming member has a magnetic force;

FIG. 18 is a schematic cross-sectional diagram of a filter device according to another example that has the second magnetic field forming member;

FIG. 19 is a schematic cross-sectional diagram of a filter device according to another example that has the second magnetic field forming member; and FIG. 20 is a schematic cross-sectional diagram of a filter device according to another example that has the second magnetic field forming member.

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example 1

Figure 1:
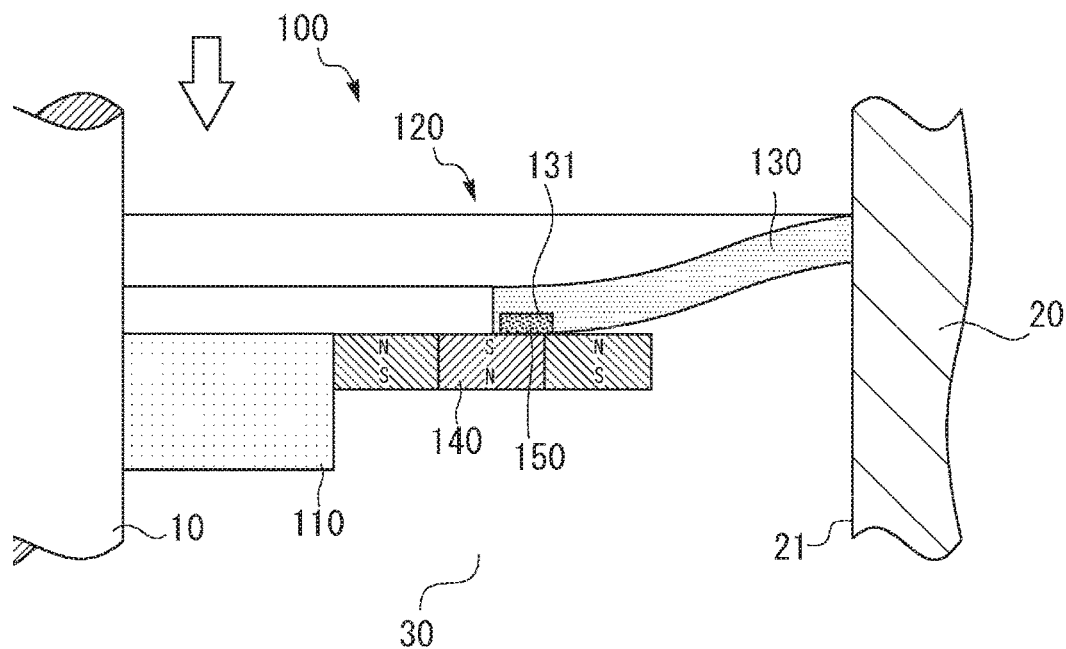
FIG. 1 is a schematic cross-sectional diagram of a filter device according to Example 1 of the present disclosure.

A filter device according to Example 1 of the present disclosure is now described with reference to FIG. 1. The filter device according to the present example can be employed for the purpose of removing the foreign matters such as dust contained in a fluid flowing through an annular gap between a shaft and a housing that rotate relative to each other in a rotary introduction part for a clean environment or vacuum of, for example, typical industrial equipment.

A configuration of the filter device according to Example 1 of the present disclosure is now described with reference to FIG. 1. FIG. 1 is a schematic cross-sectional diagram showing the configuration of a filter device 100 according to the present example. The filter device 100 is provided for the purpose of removing the foreign matters that are contained in a fluid flowing through an annular gap 30 between a shaft 10 and a housing 20 that rotate relative to each other. Note that the expression "rotate relative to each other" denotes the cases where either one of the shaft and the housing rotates while the other is fixed, as well as the cases where the both the shaft and the housing rotate. The cases where both the shaft and the housing rotate include the cases where both the shaft and the housing rotate in the same rotational direction and the cases where the shaft and the housing rotate in rotational directions different to each other. In the present example, the fluid may be a gas or liquid and flows through the annular gap 30 in the direction of an arrow shown in FIG. 1.

The filter device 100 has an annular filter 110 provided on the shaft 10, and a rotary seal 120 for sealing an annular gap between the housing 20 and the filter 110. The filter 110 is in an annular (cylindrical) shape, and an inner circumferential surface thereof is fixed to an outer circumferential surface of the shaft 10. As a fixation method will be described hereinafter in detail, it is preferred that the filter be fixed detachably for easy replacement thereof. The filter 110 is made of a hard material (metal, ceramic, etc.) with minute pores and removes (traps) the solid foreign matters such as dust contained in the fluid that enters from an upstream side end surface and flows out from a downstream side end surface. Note that the performance of the filter 110 may be determined in accordance with the sizes of the foreign matters.

The rotary seal 120 has an annular sealing member 130 having flexibility and a magnet 140 functioning as an annular magnetic field forming member for forming a magnetic field around the sealing member 130. The sealing member 130 is a disc-shaped member with a hole and has an outer circumferential surface thereof fixed directly to an inner circumferential surface of a shaft hole 21 of the housing 20. The magnet 140 is a disc-shaped permanent magnet with a hole and has an inner circumferential surface thereof fixed directly to an outer circumferential surface of the filter 110. The sealing member 130 is provided in a position on an upstream side of the magnet 140. The sealing member 130 is made of a porous, flexible material such as porous silicon or other types of rubbers with minute pores but is configured not to let the fluid permeate through its outer surface (e.g. being treated with a coating, etc.) except for an opposing portion 131 described hereinafter in order to not let the fluid flowing through the annular gap 30 flow through the sealing member 130.

The sealing member 130 is formed such that its inner diameter is smaller than an outer diameter of the magnet 140. Therefore, the sealing member 130 has the annular opposing portion 131 on its inner-diameter side and free-end side that opposes the magnet 140 in an axial direction. Note that the opposing portion 131 includes an opposing surface opposing the magnet 140 and an inner portion in the vicinity of this opposing surface. The opposing portion 131 is soaked with a magnetic fluid 150. Since the sealing member 130 is made of a porous material, as described above, the soaked magnetic fluid 150 is retained in the opposing portion 131 by capillary action. It should be noted that a partition or the like may be provided on the inside of the sealing member 130 to prevent the soaked magnetic fluid 150 from spreading outside the opposing portion 131. Additionally, only the opposing portion 131 may be made of a porous, flexible material and the rest of the sealing member 130 may be made of a flexible material that does not let the liquid permeate thereinto.

The position in which the sealing member 130 is fixed is a position where the opposing portion 131 is attracted toward the magnet 140 together with the magnetic fluid 150 by the magnetic force acting on the magnetic fluid 150 and thereby comes into contact with the magnet 140. In other words, by fixing the sealing member 130 in this position, attracting of the opposing portion 131 toward the magnet 140 together with the magnetic fluid 150 causes the sealing member 130 to deform so as to sway, bringing the opposing portion 131 into contact with the magnet 140. Because the opposing portion 131 in contact with the magnet 140 is constantly pressed against the magnet 140 by the magnetic force, an annular sealing surface can stably be formed between the sealing member 130 and the magnet 140. In addition, because the magnetic fluid 150 is further attracted toward the magnet 140 by means of the magnetic force, some of the magnetic fluid 150 exudes from the opposing portion 131 and intervenes between the opposing surfaces of the opposing portion 131 and the magnet 140. This magnetic fluid 150 functions as a lubricant between these opposing surfaces. As described above, the annular gap between the housing 20 and the filter 110 is stably sealed with the rotary seal 120 with a low-friction torque, even during the relative rotation between the shaft 10 and the housing 20.

<Advantages of the Filter Device According to the Present Example>

According to the filter device of the present example, even in a case where the pressure of the fluid flowing through the annular gap 30 is high, favorable sealing performance of the rotary seal 120 can be ensured. This aspect is described hereinafter in detail.

First, the filter device 100 in use is described with reference to FIG. 1. Once the fluid flows through the annular gap 30 in the direction of the arrow, the fluid passes through the filter 110 because the space between the filter 110 and the housing 20 are sealed with the rotary seal 120. Consequently, the foreign matters contained in the fluid are removed by the filter 110. The resistance of the filter 110 makes the pressure of the fluid in a region in the annular gap 30 on the upstream side of the filter 110 higher than that of the fluid in a region on the downstream side. Note that the sealing member 130 is provided on the upstream side of the magnet 140. Thus, the pressure of the fluid flowing through the annular gap 30 acts on the sealing member 130 in the direction toward the magnet 140. This fluid pressure further presses the opposing portion 131 against the magnet 140, enhancing the sealing performance of the sealing surface between the sealing member 130 and the magnet 140. The higher the fluid pressure, the stronger the opposing portion 131 is pressed; hence the sealing performance of the sealing surface is further enhanced. In addition, due to the enhanced sealing performance, the magnetic fluid 150 intervening between the opposing portion 131 and the magnet 140 becomes less likely to disperse. While there is a possibility that the shaft 10 might move in the axial direction due to the resistance of the filter 110, because the flexible sealing member 130 can follow the movement of the magnet 140, the sealing surface can be maintained securely. According to the present example, therefore, the sealing performance of the rotary seal 120 can favorably be ensured even when a high fluid pressure acts.

In addition, in the present example, the magnet 140 is provided on the filter 110 and the sealing member 130 is provided on the inner circumferential surface of the shaft hole 21 of the housing 20. Therefore, the filter 110 and the rotary seal 120 can be integrated in the annular gap 30, accomplishing a size reduction of the filter device 100. Particularly, in the present example, the filter 110 is made of a hard material. Thus, the magnet 140 can be fixed directly to the filter 110. Therefore, the number of parts can be reduced to less than those of the conventional filter devices; hence the size reduction of the filter device 100 can be further achieved.

Incidentally, during the relative rotation between the shaft 10 and the housing 20, the shaft 10 and the housing 20 may move (be displaced) irregularly in the axial direction or radial direction due to axial runout, vibrations, and the like. In the present example, however, the flexible sealing member 130 is constantly attracted toward the magnet 140, so the opposing portion 131 can deform in the axial direction or radial direction while being pressed against the magnet 140. Therefore, the sealing surface between the sealing member 130 and the magnet 140 can favorably be maintained even when the relative positions of the shaft 10 and the housing 20 change in the axial or radial directions due to such irregular movements of the shaft 10 and housing 20.

In the present example, because the sealing member 130 is attracted toward the magnet 140, the axial or radial positions of the shaft 10 in the housing 20 may be set within a range in which the attracted sealing member 130 can form the sealing surface between the magnet 140 and itself. Therefore, according to the rotary seal 120 of the present example, positioning of the shaft 10 upon insertion can be performed more easily when compared with the conventional magnetic fluid seals in which the magnetic fluid is retained in the small annular gap between the shaft and the pole piece. Note that because the removed foreign matters accumulate in the filter 110, the filter 100 needs to be replaced. According to the present example, even in a case where the shaft 10 is removed from the housing 20, the positioning of the shaft 10 can easily be done upon re-insertion; enabling easy replacement of the filter. In addition, in the present example, the filter 110 is provided on the shaft 10. The present example, therefore, is advantageous in view of the fact that it is possible to remove the filter 110 from the housing 20 by removing the shaft 10 in a downward direction in FIG. 1.

In the present example, the opposing surfaces of the opposing portion 131 and the magnet 140 are lubricated by the magnetic fluid 150. Therefore, generation of dust can be reduced more as compared to a rotary seal that employs a lubricant such as grease. Also in the present example, the magnetic field acting on the magnetic fluid 150 is formed by the magnet 140 provided on the filter 110. The present example, therefore, is advantageous in view of the fact that it has many options of materials because it is not necessary to use a magnetic material as the material of the shaft 10 or housing 20. Furthermore, according to the present example, the flexible sealing member 130 is attracted toward the magnet 140, thereby forming the sealing surface. The present example, therefore, is also advantageous in view of the fact that high dimensional accuracy is not required in manufacturing the shaft 10 and the housing 20.

Note that in the present example, the magnet 140 may be configured to rotate faster than the sealing member 130. According to this configuration, the sealing member 130 rotates more slowly than the magnet 140 or remains still. For this reason, the centrifugal force acts less on the sealing member 130 that is deformed to come into contact with the magnet 140, as compared to a case where the sealing member 130 rotates faster than the magnet 140. Accordingly, a force in a centrifugal direction that inhibits the deformation of the sealing member 130 acts less on the sealing member 130; thereby making the sealing surface between the sealing member 130 and the magnet 140 more likely to be maintained favorably. In particular, when the sealing member 130 remains still and only the magnet 140 rotates, or in other words when the housing 20 remains still, the sealing surface can favorably be maintained because no centrifugal force acts on the sealing member 130.

Example 2

Figure 2:
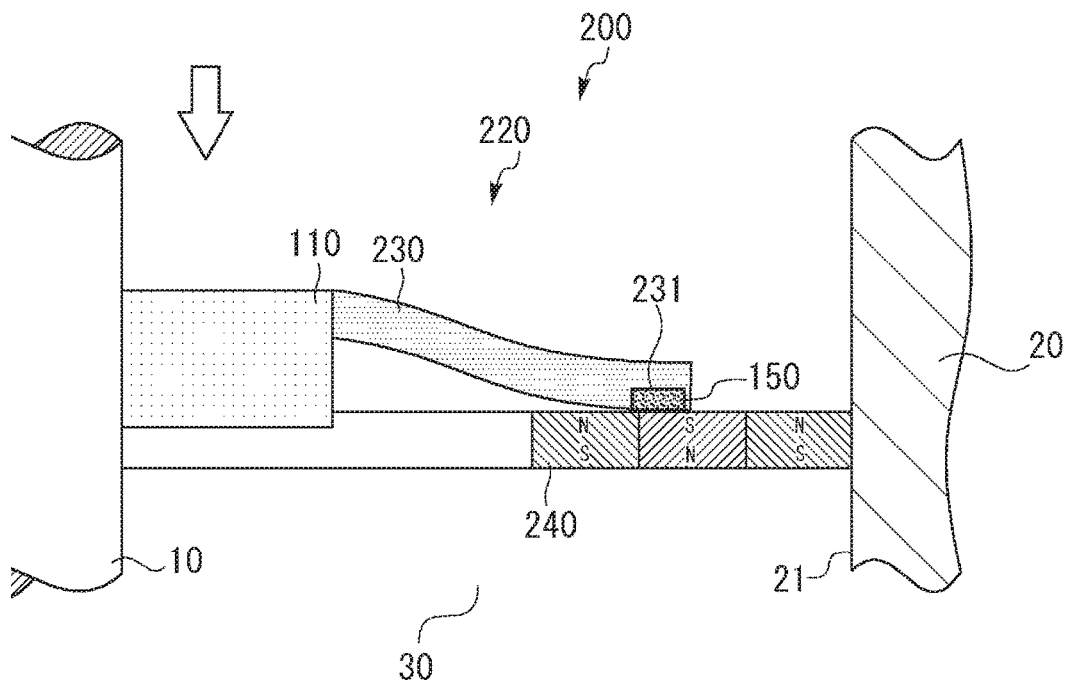
FIG. 2 is a schematic cross-sectional diagram of a filter device according to Example 2 of the present disclosure.

A filter device according to Example 2 of the present disclosure is described next with reference to FIG. 2. Unlike Example 1 described above, in the present example, the sealing member of the rotary seal is provided on the filter and the magnetic field forming member is provided on the housing. Note that the same reference numerals are used to describe the components that are the same as those described in Example 1, and the descriptions thereof are omitted accordingly. Note that FIG. 2 is a schematic cross-sectional diagram showing a configuration of a filter device 200 according to the present example.

The filter device 200 has the annular filter 110 provided on the shaft 10, and a rotary seal 220 for sealing the annular gap between the housing 20 and the filter 110. This rotary seal 220 has an annular sealing member 230 fixed directly to the outer circumferential surface of the filter 110, and an annular magnet 240 fixed directly to the inner circumferential surface of the shaft hole 21 of the housing 20. Note that the shapes, materials, set positions and the like of the sealing member 230 and magnet 240 are the same as the shapes, materials, set positions and the like of the sealing member 130 and magnet 140 described in Example 1, respectively. However, the sealing member 230 is formed such that its outer diameter is greater than an inner diameter of the magnet 240. Therefore, the sealing member 230 has an annular opposing portion 231 on its outer-diameter side and free-end side that opposes the magnet 240 in the axial direction. Note that the opposing portion 231 includes an opposing surface opposing the magnet 240 and an inner portion in the vicinity of this opposing surface, as with the opposing portion 131 described in Example 1. The opposing portion 231 is soaked with the magnetic fluid 150.

The filter device 200 with the foregoing configuration produces the same effects as the filter device 100 according to Example 1. Specifically, when magnetic force acting on the magnetic fluid 150 attracts the opposing portion 231 toward the magnet 240, the sealing member 230 deforms so as to sway, bringing the opposing portion 231 into contact with the magnet 240. As a result, an annular sealing surface is formed between the sealing member 230 and the magnet 240, and the opposing surfaces of the opposing portion 231 and magnet 240 are lubricated by some of the magnetic fluid 150. The annular gap between the housing 20 and the filter 110, therefore, is stably sealed with the rotary seal 220 with a low-friction torque, even during the relative rotation between the shaft 10 and the housing 20. In addition, because the sealing member 230 is provided on the upstream side of the magnet 240, the pressure of the fluid flowing through the annular gap 30 contributes to the sealing performance of the sealing surface between the sealing member 230 and the magnet 240. In particular, the higher the fluid pressure, the greater the sealing performance of the sealing surface. Therefore, in the present example as well, the rotary seal 220 can realize high pressure tightness.

According to the present example as well, the filter 110 and the rotary seal 220 can be integrated in the annular gap 30, and the sealing member 230 can be fixed directly to the filter 110 made of a hard material; thereby leading to a further size reduction of the filter device 200. Moreover, according to the present example as well, because the flexible sealing member 230 is attracted toward the magnet 240, the sealing surface can favorably be maintained even when the relative positions of the shaft 10 and the housing 20 rotating relative to each other change. Furthermore, the positioning of the shaft 10 with respect to the housing 20 can be determined easily, enabling an easy replacement of the filter. In addition, the present example is also advantageous in view of the fact that high dimensional accuracy is not required in manufacturing the shaft 10 and the housing 20.

Note that in the present example, the magnet 240 may be configured to rotate faster than the sealing member 230. According to this configuration, the sealing member 230 rotates more slowly than the magnet 240 or remains still. For this reason, the centrifugal force acts less on the sealing member 230 that is deformed to come into contact with the magnet 240, as compared to a case where the sealing member 230 rotates faster than the magnet 240. Accordingly, a force in a centrifugal direction that inhibits the deformation of the sealing member 230 acts less on the sealing member 230; thereby making the sealing surface between the sealing member 230 and the magnet 240 more likely to be maintained favorably. In particular, when the sealing member 230 remains still and only the magnet 240 rotates, or in other words when the shaft 10 remains still, the sealing surface can favorably be maintained because no centrifugal force acts on the sealing member 230.

Example 3

Figure 3:
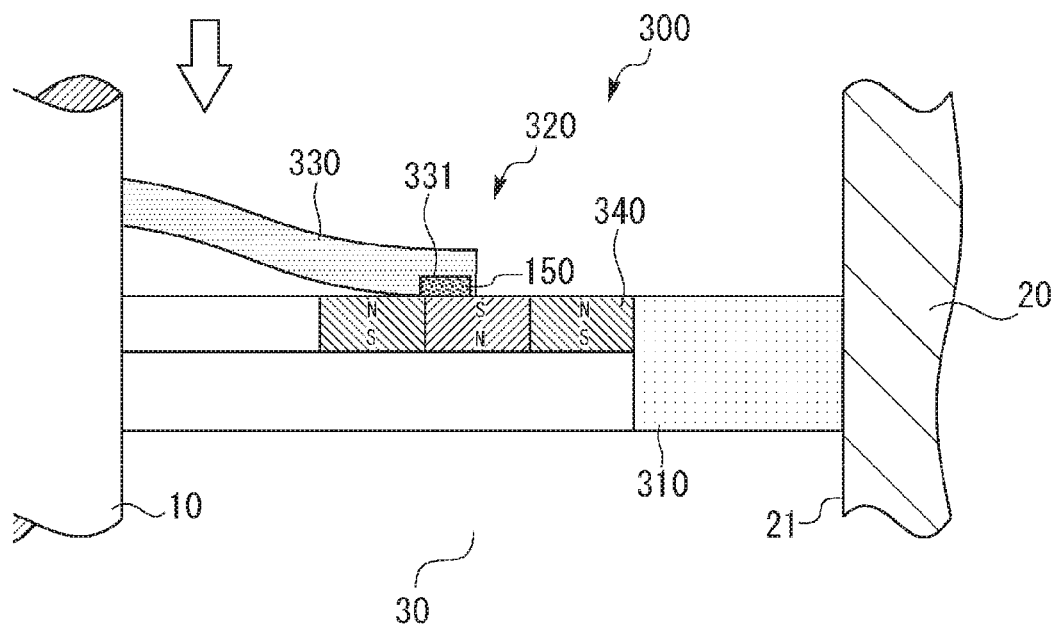
FIG. 3 is a schematic cross-sectional diagram of a filter device according to Example 3 of the present disclosure.

A filter device according to Example 3 of the present disclosure is described next with reference to FIG. 3. Unlike the examples described above, in the present example, a filter is provided on the housing. Note that the same reference numerals are used to describe the components that are the same as those described in the examples described above, and the descriptions thereof are omitted accordingly. Note that FIG. 3 is a schematic cross-sectional diagram showing a configuration of a filter device 300 according to the present example.

The filter device 300 has an annular filter 310 provided on the housing 20, and a rotary seal 320 for sealing an annular gap between the shaft 10 and the filter 310. The filter 310 has an annular (cylindrical) shape and an outer circumferential surface thereof is fixed to the inner circumferential surface of the shaft hole 21 of the housing 20. Note that a material, fixation method and the like of the filter 310 are the same as those of the filter 110 of the examples described above. The rotary seal 320 has an annular sealing member 330 fixed directly to the outer circumferential surface of the shaft 10, and an annular magnet 340 fixed directly to an inner circumferential surface of the filter 310. Note that the shapes, materials, set positions and the like of the sealing member 330 and magnet 340 are the same as the shapes, materials, set positions and the like of the sealing member and magnet described in the above examples, respectively. However, the sealing member 330 is formed such that its outer diameter is greater than an inner diameter of the magnet 340. Therefore, the sealing member 330 has an annular opposing portion 331 on its outer-diameter side and free-end side that opposes the magnet 340 in the axial direction. Note that the opposing portion 331 includes an opposing surface opposing the magnet 340 and an inner portion in the vicinity of this opposing surface, as with the opposing portions described in above examples. The opposing portion 331 is soaked with the magnetic fluid 150.

The filter device 300 with the foregoing configuration produces the same effects as the filter devices according to the examples described above. Specifically, when magnetic force acting on the magnetic fluid 150 attracts the opposing portion 331 toward the magnet 340, the sealing member 330 deforms so as to sway, bringing the opposing portion 331 into contact with the magnet 340. As a result, an annular sealing surface is formed between the sealing member 330 and the magnet 340, and the opposing surfaces of the opposing portion 331 and magnet 340 are lubricated by some of the magnetic fluid 150. The annular gap between the shaft 10 and the filter 310, therefore, is stably sealed with the rotary seal 320 with a low-friction torque, even during the relative rotation between the shaft 10 and the housing 20. In addition, because the sealing member 330 is provided on an upstream side of the magnet 340, the pressure of the fluid flowing through the annular gap 30 contributes to the sealing performance of the sealing surface between the sealing member 330 and the magnet 340. As a result, in the present example as well, the same effects as those of the filter devices according to the above examples can be exerted. Note that in the filter device 300, because the filter 310 is fixed to the housing 20, the filter 310 cannot be removed from the housing 20 together with the shaft 10. Nevertheless, a space to work in will be provided in the shaft hole 21 if the shaft 10 is removed; hence a replacement of the filter can be done easily. In addition, according to the filter device 300, because the rotary seal 320 is provided, the positioning of the shaft 10 upon insertion is facilitated; hence a replacement of the filter can be done easily the filter device 300 as well.

Note that in the present example, the magnet 340 may be configured to rotate faster than the sealing member 330. According to this configuration, the sealing member 330 rotates more slowly than the magnet 340 or remains still. For this reason, similarly to the above examples, the centrifugal force acts less on the sealing member 330 as compared to a case where the sealing member 330 rotates faster than the magnet 340. Accordingly, the sealing surface between the sealing member 330 and the magnet 340 is more likely to be maintained favorably. In particular, when the sealing member 330 remains still and only the magnet 340 rotates, the sealing surface can favorably be maintained because no centrifugal force acts on the sealing member 330.

Example 4

A filter device according to Example 4 of the present disclosure is described next with reference to FIG. 4. Unlike Example 3 described above, in the present example, a sealing member of the rotary seal is provided on the filter, and magnetic field forming member is provided on the shaft. Note that the same reference numerals are used to describe the components that are the same as those described in Example 3, and the descriptions thereof are omitted accordingly. Note that FIG. 4 is a schematic cross-sectional diagram showing a configuration of a filter device 400 according to the present example.

The filter device 400 has the annular filter 310 provided on the housing 20, and a rotary seal 420 for sealing the annular gap between the shaft 10 and the filter 310. The rotary seal 420 has an annular sealing member 430 fixed directly to the inner circumferential surface of the filter 310, and an annular magnet 440 fixed directly to the outer circumferential surface of the shaft 10. Note that the shapes, materials, set positions and the like of the sealing member 430 and magnet 440 are the same as the shapes, materials, set positions and the like of the sealing member and magnet described in the above examples, respectively. However, the sealing member 430 is formed such that its inner diameter is smaller than an outer diameter of the magnet 440. Therefore, the sealing member 430 has an annular opposing portion 431 on its inner-diameter side and free-end side that opposes the magnet 440 in the axial direction. Note that the opposing portion 431 includes an opposing surface opposing the magnet 440 and an inner portion in the vicinity of this opposing surface, as with the opposing portions described in above examples. The opposing portion 431 is soaked with the magnetic fluid 150.

The filter device 400 with the foregoing configuration produces the same effects as the filter device according to Example 3 described above. Specifically, when the opposing portion 431 is attracted toward the magnet 440, the sealing member 430 deforms so as to sway, bringing the opposing portion 431 into contact with the magnet 440. As a result, an annular sealing surface is formed between the sealing member 430 and the magnet 440. In addition, because the sealing member 430 is provided on an upstream side of the magnet 440, the pressure of the fluid flowing through the annular gap 30 contributes to the sealing performance of the sealing surface between the sealing member 430 and the magnet 440. As a result, in the present example as well, the same effects as those of the filter device according to Example 3 can be exerted.

Note that in the present example, the magnet 440 may be configured to rotate faster than the sealing member 430. According to this configuration, the sealing member 430 rotates more slowly than the magnet 440 or remains still. For this reason, similarly to the above examples, the centrifugal force acts less on the sealing member 430 as compared to a case where the sealing member 430 rotates faster than the magnet 440. Accordingly, the sealing surface between the sealing member 430 and the magnet 440 is more likely to be maintained favorably. In particular, when the sealing member 430 remains still and only the magnet 440 rotates, the sealing surface can favorably be maintained because no centrifugal force acts on the sealing member 430.

[Filter Fixation Method]

In the filter device according to the present example, the foreign matters removed from the fluid are accumulated in the filter, raising the need to replace the filter. Therefore, it is preferred that the filter be fixed detachably to the shaft or housing. As already described above, the flexible sealing member deforms while being attracted toward the magnet. For this reason, high precision positional control is not necessary in fixing the filter to the shaft. However, since the pressure of the fluid flowing through the annular gap acts axially on the filter, the fixation method needs to be robust to a certain extent. The method for fixing the filter to the shaft or housing is described hereinafter with reference to the drawings. The filter device 100 according to Example 1 is described as an example, but the same fixation method can be used for the other examples as well. These fixation methods may be used to fix the sealing member or magnetic field forming member to the shaft or housing.

FIGS. 5 to 7 are each a schematic cross-sectional diagram showing a method for fixing the filter 110 to the shaft 10 of the filter device 100 according to Example 1. The same reference numerals are used to describe the same components; thus, the descriptions thereof are omitted accordingly.

In a fixation method shown in FIG. 5, the filter 110 is fixed to the shaft 10 by means of a set screw 90 that is tightened to an outward flange 112 of the filter 110. Note that a gap between an outer circumferential surface 11 of the shaft 10 and an inner circumferential surface 111 of the filter 110 is sealed with an O-ring 91. In this fixation method, the axial and rotational positions of the filter 110 are determined by the set screw 90. The number of set screw 90 and the tightening force thereof may be determined accordingly. The filter 110 can easily be removed from the shaft 10 by removing the set screw 90.

In a fixation method shown in FIG. 6, the filter 110 is fixed by two snap rings 92 and 93 that are provided on either side of the filter 110 in the axial direction. The snap ring 92 is fitted into an annular groove 12 provided on the outer circumferential surface 11 of the shaft 10, while making contact with one of end surfaces of the filter 110 in the axial direction. An axially downward projection of the snap ring 92 is fitted to a concave portion 113 provided on the one of the end surfaces of the filter 110 in the axial direction. In addition, the snap ring 93 is fitted into an annular groove 13 provided on the outer circumferential surface 11 of the shaft 10, while making contact with another of the end surfaces of the filter 110 in the axial direction. In this fixation method, the axial and radial positions of the filter 110 are determined by the snap rings 92 and 93. The filter 110 can easily be removed from the shaft 10 by removing the snap rings 92 and 93.

In a fixation method shown in FIG. 7, the filter 110 is fixed by an annular spring 94 that is fitted into an annular groove 115 provided in an outward flange 114 of the filter 110. In this fixation method, the axial and rotational positions of the filter 110 are determined by the spring 94. The filter 110 can easily be removed from the shaft 10 by removing the spring 94.

According to the present example, the filter 110 can be fixed, in a simple detachable manner, to the outer circumferential surface 11 of the shaft 10 by using the fixation method described above. Therefore, the filter 110 can be replaced easily when the shaft 10 is removed from the housing 20.

The fixation methods shown in FIGS. 5 to 7 can similarly be employed when fixing a filter 310 to an inner circumferential surface 21 of the shaft hole 21 of the housing 20 in Examples 3 and 4.

[Other Examples of the Filter]

Other examples of the filter applicable to the present disclosure are described next with reference to FIGS. 8 to 11. First, a configuration in which the sealing member is integrated with the filter by using the same material as that of the filter is described with reference to FIGS. 8 and 9.

FIG. 8 shows a filter device 500 to which a filter 510 is applied in place of the filter 110 and the sealing member 230 of the foregoing filter device 200 according to Example 2. Note that the filter 510 is such a filter in which a sealing portion functioning as a sealing member is integrated with the filter by using the same material as that of the filter. Note that the same reference numerals are used to describe the components same as those described in Example 2; thus, the descriptions thereof are omitted accordingly. FIG. 8 is a schematic cross-sectional diagram showing a configuration of the filter device 500.

The filter 510 made of a porous material having flexibility has a cylindrical filter portion 511 and a disc-shaped sealing portion 530 with a hole, that is provided on an outer circumferential surface of the filter portion 511. Specifically, the sealing portion 530 is integrated with the filter portion 511 into a single component, by using the same material as that of the filter portion 511. This material is preferably a flexible, porous material that can be hardened and the small pores thereof are closed when a heat treatment or the like is applied. Examples of such a material include a porous organic polymeric material. When such material is used, by applying a heat treatment on an outer circumferential surface of the filter portion 511 except for the sealing portion 530, the pores in the outer circumferential surface, can be closed and hardened. Consequently, the filter portion 511 is configured such that it prevents the fluid flowing through the inside of the filter portion 511 from flowing out through the outer circumferential surface, and that it does not deform due to a weight of the filter 510 or the pressure of the fluid. In addition, permeation of the fluid can be prevented by performing the same treatment on the outer surface of the sealing portion 530 except for an opposing portion 531 described hereinafter.

The sealing portion 530 is configured into the same shape as the sealing member 230 of the filter device 200. The sealing portion 530, therefore, has the annular opposing portion 531 on its outer-diameter side and free-end side that opposes the magnet 240 in the axial direction. Note that the opposing portion 531 includes an opposing surface opposing the magnet 240 and an inner portion in the vicinity of this opposing surface. The opposing portion 531 is soaked with the magnetic fluid 150.

The filter device 500 with the foregoing configuration produces the same effects as the filter device 200 according to Example 2 described above. Specifically, when the opposing portion 531 is attracted toward the magnet 240, the sealing portion 530 deforms so as to sway, bringing the opposing portion 531 into contact with the magnet 240. As a result, an annular sealing surface is formed between the sealing portion 530 and the magnet 240. In addition, because the sealing portion 530 is provided on the upstream side of the magnet 240, the pressure of the fluid flowing through the annular gap 30 contributes to the sealing performance of the sealing surface between the sealing portion 530 and the magnet 240. As a result, in the present example as well, the same effects as those of the filter device 200 can be exerted. Note that in the present example, the sealing portion 530 and the magnet 240 configure the rotary seal. In addition, in the present example as well, the magnet 240 may be configured to rotate faster than the sealing portion 530. By configuring so, the sealing surface between the sealing portion 530 and the magnet 240 can favorably be maintained easily, as with the foregoing example.

Furthermore, according to the present example, the sealing portion 530 is integrated with the filter portion 511 by using the same material as that of the filter portion 511; thereby making it possible to reduce of the number of parts. As a result, a further size reduction of the filter device and a reduction in manufacturing cost can be accomplished.

FIG. 9 shows a filter device 600 to which a filter 610 is applied in place of the filter 310 and the sealing member 430 of the foregoing filter device 400 according to Example 4. Note that the filter 610 is integrated with a sealing portion functioning as the sealing member, using the same material as that of the filter. Note that the same reference numerals are used to describe the components same as those described in Example 4; thus, the descriptions thereof are omitted accordingly. FIG. 9 is a schematic cross-sectional diagram showing a configuration of the filter device 600.

The filter 610 has a cylindrical filter portion 611 and a disc-shaped sealing portion 630 with a hole, which is provided on an inner circumferential surface of the filter portion 611. Specifically, the sealing portion 630 is integrated with the filter portion 611 into a single component, by using the same material as that of the filter portion 611. The filter 610 may be made of the same material as that of the filter 510 so that the filter portion 611 and the sealing portion 630 have the same functions as those of the filter portion 511 and the sealing portion 530 of the filter 510 described above.

The sealing portion 630 is configured into the same shape as the sealing member 430 of the filter device 400. The sealing portion 630, therefore, has an annular opposing portion 631 on its inner-diameter side and free-end side that opposes the magnet 440 in the axial direction. Note that the opposing portion 631 includes an opposing surface opposing the magnet 440 and an inner portion in the vicinity of this opposing surface. The opposing portion 631 is soaked with the magnetic fluid 150.

The filter device 600 with the foregoing configuration produces the same effects as the filter device 400 according to Example 4 described above. In addition, in the present example as well, the magnet 440 may be configured to rotate faster than the sealing portion 630. By configuring so, the sealing surface between the sealing portion 630 and the magnet 440 can favorably be maintained easily, as with the foregoing example. In addition, according to the filter device 600, the number of parts thereof can be reduced; a further size reduction of the filter device and a reduction in manufacturing cost can be achieved, as with the filter device 500.

Next, a filter that has a filter element for removing foreign matters and a holder for storing the filter element is described, with reference to FIGS. 10 and 11, FIG. 10 shows a filter device 700 to which a filter 710 configured with a filter element and a holder is applied in place of the filter 110 of the filter device 100 according to Example 1. Note that the same reference numerals are used to describe the components same as those described in Example 1; thus, the descriptions thereof are omitted accordingly. FIG. 10 is a schematic cross-sectional diagram showing a configuration of the filter device 700.

The filter 710 is configured with a filter element 711 for removing the foreign matters contained in a fluid flowing internally and a cylindrical holder 712 in which this filter element is contained. The holder 712 is made of a hard material such as metal. Therefore, the magnet 140 can be provided on the holder 712, as with the filter 110 of the filter device 100. Accordingly, a soft material such as paper or a hollow fiber membrane can be used as the material of the filter element 711, providing more options for the filter. In the filter device 700 as well, the sealing performance thereof provides the same effects as the foregoing filter device 100. The filter 710 can also be applied to the filter device 200 according to Example 2.

FIG. 11 shows a filter device 800 to which a filter 810 configured with a filter element and a holder is applied in place of the filter 310 of the filter device 300 according to Example 3. Note that the same reference numerals are used to describe the components same as those described in Example 3; thus, the descriptions thereof are omitted accordingly. FIG. 11 is a schematic cross-sectional diagram showing a configuration of the filter device 800.

As with the filter 710 described above, the filter 810 is configured with a filter element 811 and a cylindrical holder 812 in which this filter element 811 is contained. The holder 812 is made of a hard material such as metal. The filter device 800, therefore, provides more options for the filter as with the filter device 700 described above. In the filter device 800 as well, the sealing performance thereof provides the same effects as the foregoing filter device 300. The filter 810 can also be applied to the filter device 400 according to Example 4.

[Other Examples of the Magnetic Field Forming Member]

Other examples of the magnetic field forming member applicable to the rotary seal of the filter device according to the present disclosure are described next with reference to FIGS. 12 to 15.

FIGS. 12 to 15 are front views showing the configurations of the magnet 140 used in Example 1 and of alternatives of the magnet 140. The magnet 140 shown in FIG. 12 is obtained by combining a plurality of (three, in FIG. 12) annular permanent magnets, each having the north pole on one face and the south pole on another face, in a concentric manner so that the north poles and the south poles are arranged alternately on one face side. According to this configuration, when applied to the filter device 100, the magnet 140 can form a magnetic field in which the opposing portion 131 comes into surface-contact with the magnet 140. The same is true when the magnet 140 is applied to the filter device 200.

The magnets shown in FIGS. 13 and 14 may be employed in place of the magnet 140. A magnet 141 shown in FIG. 13 is obtained by combining a plurality of (six, in FIG. 13) long, narrow permanent magnets, each having the north pole on one face and the south pole on another face, in such a manner that the north poles and the south poles are arranged alternately on one face side, configuring an annular magnet as a whole. A magnet 142 shown in FIG. 14 is obtained by combining a plurality of (eight, in FIG. 14) sector-shaped permanent magnets, each having the north pole on one face and the south pole on another face, in such a manner that the north poles and the south poles are arranged alternately on one face side of the magnet 142.

The electromagnet shown in FIG. 15 may be employed in place of the magnet 140. An electromagnet 143 shown in FIG. 15 is obtained by combining sector-shaped permanent magnets that each have the north pole on one face and the south pole on another face, in the same manner as in the magnet 142. It should be noted that a controller 144 functioning as controlling means for controlling the magnetic force of the electromagnet 143 is electrically connected to the electromagnet 143 by a conductor wire 145. According to this configuration, it becomes possible to control the magnetic force of the electromagnet 143; hence it becomes possible to adjust the sealing performance of the rotary seal in accordance with, for example, the pressure of the fluid flowing through the annular gap 30. In addition, the magnetic force of the electromagnet 143 can be eliminated when removing the shaft 10 from the housing 20 or inserting the shaft 10 into the housing 20 in order to replace the filter. Accordingly, an adhesion of the magnetic fluid and an attraction of the sealing member to the electromagnet 143 are prevented; hence, those works are facilitated. Note that when applying the electromagnet 143 to these filter devices, the conductor wire 145 may be installed on the outer circumferential surfaces or inside of the filter 110 and shaft 10.

Note that with respect to the magnets 140, 141, 142 and the electromagnet 143, some magnets among the all magnets configuring the whole may be replaced with magnetic bodies other than permanent magnets or electromagnets. In addition, the magnets 140, 141, 142 and the electromagnet 143 can be applied to the magnets of the other examples by changing the sizes thereof.

[Examples Including a Second Magnetic Field Forming Member]

Next, filter devices according to examples that include a second magnetic field forming member are described, with reference to FIGS. 16 to 20. In these examples, magnetic field forming members are electromagnets, and a second electromagnet that functions as a second magnetic field forming member is provided on upstream side of a sealing member.

A filter device 1100 according to an example shown in FIG. 16 shares basic configuration with the filter device 100 according to Example 1, except that the electromagnet 143 is provided in place for the magnet 140 and that it further includes the controller 144 and a second electromagnet 146. Note that the same reference numerals are used to describe the components that are the same as those described in Example 1, and the descriptions thereof are omitted accordingly. Note that FIG. 16 is a schematic cross-sectional diagram of the filter device 1100 showing a state in which only the electromagnet 143 has a magnetic force. FIG. 17 is a schematic cross-sectional diagram of the filter device 1100 showing a state in which only the second electromagnet 146 has a magnetic force.

A rotary seal 1120 of the filter device 1100 has the sealing member 130 and the annular electromagnet 143 that is provided on the outer circumferential surface of the filter 110. A shape, dimension, set position and the like of the electromagnet 143 are the same as those of the magnet 140 of the filter device 100. The electromagnet 143 is electrically connected to the controller 144, which is disposed outside the filter device 11, by the conductor wire 145. The filter device 1100 has the second electromagnet 146, which is an annular (disc-shaped with a hole) electromagnet provided at a position on the shaft 10 on the upstream side of the sealing member 130. The second electromagnet 146 has an inner circumferential surface thereof fixed directly to the outer circumferential surface of the shaft 10 and is electrically connected to the controller 144 by a conducting wire 148. The controller 144 can control the magnetic forces of the electromagnet 143 and the second electromagnet 146 independently.

The second electromagnet 146 has an outer diameter that is greater than the inner diameter of the sealing member 130. Therefore, the sealing member 130 has an annular second opposing portion 132 on the upstream side of its inner-diameter side that opposes the second electromagnet 146 in the axial direction. Note that the second opposing portion 132 includes an opposing surface opposing the second electromagnet 146 and an inner portion in the vicinity of this opposing surface. The opposing portion 132 is soaked with the magnetic fluid 150. Note that the opposing portion 131 and the second opposing portion 132 may be partitioned by a partition in order to suppress the dispersion of the magnetic fluid 150, or may be configured to allow the magnetic fluid 150 to move between the two opposing portions.

The position where the second electromagnet 146 is fixed is a position where the second opposing portion 132 can make contact with the second electromagnet 146 when it is attracted toward the second electromagnet 146 by the magnetic force acting on the magnetic fluid 150 soaked into the second opposing portion 132 in a case where the second electromagnet 146 has a magnetic force. In addition, on an inner circumferential side of the second electromagnet 146, in other words, on an inner circumferential side of a portion that opposes the second opposing portion 132, a communicating hole 147 that communicates a surface on an upstream side and a surface on a downstream side of the second electromagnet 146 is provided. The shape or the number of the communicating hole 147 may be determined accordingly.

According to the filter device 1100 having a configuration as described above, when the magnetic force is applied only to the electromagnet 143 by the controller 144, the opposing portion 131 is attracted toward the electromagnet 143 as shown in FIG. 16; thereby forming a sealing surface between the sealing member 130 and the electromagnet 143. Accordingly, the annular gap between the housing 20 and the filter 110 is sealed, and the fluid flowing through the annular gap 30 is filtered by the filter 110; hence, the foreign matters in the fluid are removed. In this case, the same effects as those of the filter device 100 are exerted.

On the other hand, when the magnetic force is applied only to the second electromagnet 146 by the controller 144, the second opposing portion 132 is attracted toward the second electromagnet 146 as shown in FIG. 17; hence the sealing member 130 makes contact with the second electromagnet 146. In this case, therefore, a sealing surface is formed between the sealing member 130 and the second electromagnet 146. Note that in this case, the fluid flowing through the annular gap 30 flows through the communicating hole 147. Note that in this case, the sealing member 130 is drawn apart from the electromagnet 143, as shown in FIG. 17. Therefore, the fluid that has flown through the communicating hole 147 flows through the inside of the filter 110, and a space between the sealing member 130 and the magnet 143. In this case, therefore, more fluid can be flown through the annular gap 30. Consequently, according to the present example, when it is not necessary to remove the foreign matters from the fluid, the flow rate of the fluid flowing through the annular gap 30 can be increased.

Note that the configuration in which the second electromagnet is provided can similarly be employed in the configurations of Examples 2 to 4. Thus, such configurations will be described in order.

A filter device 1200 according to an example shown in FIG. 18 shares basic configuration with the filter device 200 according to Example 2, except that an electromagnet 243 is provided in place for the magnet 240 and that it further includes the controller 144 and a second electromagnet 246. Note that the same reference numerals are used to describe the components that are the same as those described in Example 2, and the descriptions thereof are omitted accordingly. Note that FIG. 18 is a schematic cross-sectional diagram of the filter device 1200 showing a state in which only the electromagnet 243 has a magnetic force.

A rotary seal 1220 of the filter device 1200 has the sealing member 230 and the annular electromagnet 243 that is provided on the inner circumferential surface of the shaft hole 21 of the housing 20. A shape, dimension, set position and the like of the electromagnet 243 are the same as those of the magnet 240 of the filter device 200. The filter device 1200 has the second electromagnet 246, which is a disc-shaped electromagnet with a hole, and is provided at a position on the housing 20 on the upstream side of the sealing member 230. The second electromagnet 246 has an outer circumferential surface thereof fixed directly to the inner circumferential surface of the shaft hole 21 and has an inner diameter that is smaller than the outer diameter of the sealing member 230. Therefore, the sealing member 230 has an annular second opposing portion 232 on the upstream side of its outer-diameter side that opposes the second electromagnet 246 in the axial direction. Note that the second opposing portion 232 includes an opposing surface opposing the second electromagnet 246 and an inner portion in the vicinity of this opposing surface. The opposing portion 232 is soaked with the magnetic fluid 150. Moreover, the electromagnet 243 and the second electromagnet 246 are electrically connected to the controller 144 by conducting wires 245 and 248, respectively. The controller 144 can control the magnetic forces of the electromagnet 243 and the second electromagnet 246 independently.

The position where the second electromagnet 246 is fixed is a position where the second opposing portion 232 can make contact with the second electromagnet 246 when it is attracted toward the second electromagnet 246 in a case where the second electromagnet 246 has a magnetic force. In addition, on an outer circumferential side of a portion on the second electromagnet 246 that opposes the second opposing portion 232, a communicating hole 247 that communicates a surface on an upstream side and a surface on a downstream side of the second electromagnet 246 is provided.

According to the filter device 1200 having a configuration as described above, the same effects as those of the filter device 1100 can be exerted. Specifically, when the magnetic force is applied only to the electromagnet 243 by the controller 144, a sealing surface is formed between the sealing member 230 and the electromagnet 243; hence the annular gap between the housing 20 and the filter 110 is sealed. In this case, the same effects as those of the filter device 200 are exerted. On the other hand, when the magnetic force is applied only to the second electromagnet 246 by the controller 144, a sealing surface is formed between the sealing member 230 and the second electromagnet 246, whereas the sealing member 230 is drawn apart from the electromagnet 243. In this case, therefore, more fluid can be flown through the annular gap 30.

A filter device 1300 according to an example shown in FIG. 19 shares basic configuration with the filter device 300 according to Example 3, except that an electromagnet 343 is provided in place for the magnet 340 and that it further includes the controller 144 and a second electromagnet 346. Note that the same reference numerals are used to describe the components that are the same as those described in Example 3, and the descriptions thereof are omitted accordingly. Note that FIG. 19 is a schematic cross-sectional diagram of the filter device 1300 showing a state in which only the electromagnet 343 has a magnetic force.

A rotary seal 1320 of the filter device 1300 has the sealing member 330 and the annular electromagnet 343 that is provided on the inner circumferential surface of the filter 310. A shape, dimension, set position and the like of the electromagnet 343 are the same as those of the magnet 340 of the filter device 300. The filter device 1300 has the second electromagnet 346, which is a disc-shaped electromagnet with a hole, and is provided at a position on the housing 20 on the upstream side of the sealing member 330. The second electromagnet 346 has an outer circumferential surface thereof fixed directly to the inner circumferential surface of the shaft hole 21 and has an inner diameter that is smaller than the outer diameter of the sealing member 330. Therefore, the sealing member 330 has an annular second opposing portion 332 on the upstream side of its outer-diameter side that opposes the second electromagnet 346 in the axial direction. Note that the second opposing portion 332 includes an opposing surface opposing the second electromagnet 346 and an inner portion in the vicinity of this opposing surface. The opposing portion 332 is soaked with the magnetic fluid 150. Moreover, the electromagnet 343 and the second electromagnet 346 are electrically connected to the controller 144 by conducting wires 345 and 348, respectively. The controller 144 can control the magnetic forces of the electromagnet 343 and the second electromagnet 346 independently.

The position where the second electromagnet 346 is fixed is a position where the second opposing portion 332 can make contact with the second electromagnet 346 when it is attracted toward the second electromagnet 346 in a case where the second electromagnet 346 has a magnetic force. In addition, on an outer circumferential side of a portion on the second electromagnet 346 that opposes the second opposing portion 332, a communicating hole 347 that communicates a surface on an upstream side and a surface on a downstream side of the second electromagnet 346 is provided.

According to the filter device 1300 having a configuration as described above, the same effects as those of the filter device 1100 can be exerted. Specifically, when the magnetic force is applied only to the electromagnet 343 by the controller 144, a sealing surface is formed between the sealing member 330 and the electromagnet 343; hence the annular gap between the shaft 10 and the filter 310 is sealed. In this case, the same effects as those of the filter device 300 are exerted. On the other hand, when the magnetic force is applied only to the second electromagnet 346 by the controller 144, a sealing surface is formed between the sealing member 330 and the second electromagnet 346, whereas the sealing member 330 is drawn apart from the electromagnet 343. In this case, therefore, more fluid can be flown through the annular gap 30.

A filter device 1400 according to an example shown in FIG. 20 shares basic configuration with the filter device 400 according to Example 4, except that an electromagnet 443 is provided in place for the magnet 440 and that it further includes the controller 144 and a second electromagnet 446. Note that the same reference numerals are used to describe the components that are the same as those described in Example 4, and the descriptions thereof are omitted accordingly. Note that FIG. 20 is a schematic cross-sectional diagram of the filter device 1400 showing a state in which only the electromagnet 443 has a magnetic force.

A rotary seal 1420 of the filter device 1400 has the sealing member 430 and the annular electromagnet 443 that is provided on the outer circumferential surface of the shaft 10. A shape, dimension, set position and the like of the electromagnet 443 are the same as those of the magnet 440 of the filter device 400. The filter device 1400 has the second electromagnet 446, which is a disc-shaped electromagnet with a hole, and is provided at a position on the shaft 10 on the upstream side of the sealing member 430. The second electromagnet 446 has an inner circumferential surface thereof fixed directly to the outer circumferential surface of the shaft 10 and has an outer diameter that is smaller than the inner diameter of the sealing member 430. Therefore, the sealing member 430 has an annular second opposing portion 432 on the upstream side of its inner-diameter side that opposes the second electromagnet 446 in the axial direction. Note that the second opposing portion 432 includes an opposing surface opposing the second electromagnet 446 and an inner portion in the vicinity of this opposing surface. The opposing portion 432 is soaked with the magnetic fluid 150. Moreover, the electromagnet 443 and the second electromagnet 446 are electrically connected to the controller 144 by conducting wires 445 and 448, respectively. The controller 144 can control the magnetic forces of the electromagnet 443 and the second electromagnet 446 independently.

The position where the second electromagnet 446 is fixed is a position where the second opposing portion 432 can make contact with the second electromagnet 446 when it is attracted toward the second electromagnet 446 in a case where the second electromagnet 446 has a magnetic force. In addition, on an inner circumferential side of a portion on the second electromagnet 446 that opposes the second opposing portion 432, a communicating hole 447 that communicates a surface on an upstream side and a surface on a downstream side of the second electromagnet 446 is provided.

According to the filter device 1400 having a configuration as described above, the same effects as those of the filter device 1400 can be exerted. Specifically, when the magnetic force is applied only to the electromagnet 443 by the controller 144, a sealing surface is formed between the sealing member 430 and the electromagnet 443; hence the annular gap between the shaft 10 and the filter 310 is sealed. In this case, the same effects as those of the filter device 400 are exerted. On the other hand, when the magnetic force is applied only to the second electromagnet 446 by the controller 144, a sealing surface is formed between the sealing member 430 and the second electromagnet 446, whereas the sealing member 430 is drawn apart from the electromagnet 443. In this case, therefore, more fluid can be flown through the annular gap 30.

REFERENCE SIGNS LIST

10: Shaft
20: Housing
30: Annular gap
100, 200, 300, 400, 500, 600, 700, 800, 1100, 1200, 1300, 1400: Filter device
110, 310, 510, 610, 710, 810: Filter
130, 230, 330, 430: Sealing member
140, 240, 340, 440: Magnet
150: Magnetic fluid

What is claimed is:

1. A filter device for removing foreign matters that are contained in a fluid flowing through an annular gap between a shaft and a housing that rotate relative to each other, the filter device comprising:
    an annular filter provided on one of the shaft and the housing; and
    a rotary seal for sealing an annular gap between the filter and another of the shaft and the housing that is not provided with the filter,
    wherein the rotary seal comprises:
        an annular sealing member having flexibility; and
        an annular magnetic field forming member for forming a magnetic field,
    wherein one of the sealing member and the magnetic field forming member is provided on the filter, and another of the sealing member and the magnetic field forming member is provided on the other of the shaft and the housing that is not provided with the filter,
    the sealing member is provided on an upstream side of the magnetic field forming member and comprises an annular opposing portion that opposes the magnetic field forming member in an axial direction, and a magnetic fluid soaked into the opposing portion, wherein the opposing portion is adapted to make contact with the magnetic field forming member when it is attracted toward the magnetic field forming member due to a magnetic force acting on the magnetic fluid.

2. The filter device according to claim 1, wherein the magnetic field forming member is configured to rotate faster than the sealing member.

3. The filter device according to claim 1, wherein the filter is made of a hard material.

4. The filter device according to claim 1, wherein the sealing member is integrated with the filter by using a same material as that of the filter.

5. The filter device according to claim 1, wherein the magnetic field is an electromagnet, and
    the filter device further comprises a controller for controlling the magnetic force of the magnetic field forming member.

6. The filter device according to claim 5, wherein the filter device further comprises:
    a second magnetic field forming member that is an annular electromagnet provided on an upstream side of the sealing member on the one of the shaft and the housing that is provided with the magnetic field forming member, or on an upstream side of the sealing member provided on the one of the shaft and the housing that is provided with the filter provided with the magnetic field forming member, the second magnetic field forming member comprising a communicating hole that communicates a surface on an upstream side thereof and a surface on a downstream side thereof,
wherein the controller further controls a magnetic force of the second magnetic field forming member, and
the sealing member further comprises an annular second opposing portion that opposes the second magnetic field forming member in the axial direction, and a magnetic fluid soaked into the second opposing portion, wherein the second opposing portion is adapted to make contact with the second magnetic field forming member when it is attracted toward the second magnetic field forming member due to a magnetic force acting on the magnetic fluid soaked into the second opposing portion.

* * * * *